US010746912B2

(12) United States Patent
Choi et al.

(10) Patent No.: US 10,746,912 B2
(45) Date of Patent: Aug. 18, 2020

(54) COLOR GENERATION DEVICE HAVING FIRST AND SECOND BIREFRINGENCE MEDIA FOR GENERATING IMPROVED COLOR BY INCREASING TENDENCY OF LINEAR-POLARIZATION AND METHOD FOR THE SAME

(71) Applicants: Uk Choi, Gyeonggi-do (KR); Ju Won Kim, Seoul (KR)

(72) Inventors: Uk Choi, Gyeonggi-do (KR); Ju Won Kim, Seoul (KR)

( * ) Notice: Subject to any disclaimer, the term of this patent is extended or adjusted under 35 U.S.C. 154(b) by 428 days.

(21) Appl. No.: 15/555,501

(22) PCT Filed: Mar. 2, 2016

(86) PCT No.: PCT/KR2016/002060
§ 371 (c)(1),
(2) Date: Sep. 2, 2017

(87) PCT Pub. No.: WO2016/140499
PCT Pub. Date: Sep. 9, 2016

(65) Prior Publication Data
US 2018/0045871 A1   Feb. 15, 2018

(30) Foreign Application Priority Data
Mar. 3, 2015  (KR) .................. 10-2015-0029529

(51) Int. Cl.
*G02B 5/30*  (2006.01)
*G09F 19/12*  (2006.01)
(Continued)

(52) U.S. Cl.
CPC ............. *G02B 5/3041* (2013.01); *G02B 5/30* (2013.01); *G02B 5/32* (2013.01); *G09F 19/12* (2013.01); *G02B 5/3083* (2013.01); *G02B 27/28* (2013.01)

(58) Field of Classification Search
CPC ........ G02B 5/30; G02B 5/3041; G02B 5/305; G02B 5/3083; G02B 27/28; G02B 27/281;
(Continued)

(56) References Cited

U.S. PATENT DOCUMENTS 7,417,796 B2*  8/2008  Wang ................ G02B 5/281
                                                        349/201
2005/0248960 A1  11/2005  Yamashita et al.
(Continued)

FOREIGN PATENT DOCUMENTS

CN    101196588 A    6/2008
EP    1691223 A1    8/2006
(Continued)

OTHER PUBLICATIONS

International Search Report dated Jun. 21, 2016 for International Patent Application No. PCT/KR2016/002060.
(Continued)

*Primary Examiner* — Ryan S Dunning
(74) *Attorney, Agent, or Firm* — Bachman & LaPointe, P.C.

(57) ABSTRACT

A color generation device 1000 according to the present invention has a light source 8, and also has a linear polarizing means 10, a first birefringence medium 30a and a second birefringence medium 30b attached to each other in sequence in front of the light source 8. A display means 500 is provided which is distanced from the linear polarizing means 10, the first birefringence medium 30a and a second birefringence medium 30b. The first birefringence means 30a is arranged for the principal axes thereof to be at angle of 45° or −45° with respect to the polarization direction a1 of the linear polarizing means 10 and the second birefringence medium 30b is arranged for the principal axes thereof
(Continued)

to be the same as or perpendicular to polarization direction a1 of the linear polarizing means 10 and quarter wave plate is used therefor.

16 Claims, 12 Drawing Sheets

(51) Int. Cl.
*G02B 5/32* (2006.01)
*G02B 27/28* (2006.01)

(58) Field of Classification Search
CPC .. G02B 27/283; G02B 27/286; G02B 27/288; G09F 19/12
USPC ............ 359/489.01, 489.02, 489.07, 489.15, 359/489.16, 489.17, 489.19, 490.01, 359/490.02, 491.01
See application file for complete search history.

(56) References Cited

U.S. PATENT DOCUMENTS

| 2013/0120962 A1 | 5/2013 | Choi et al. |
| 2013/0242528 A1 | 9/2013 | Choi et al. |
| 2015/0370084 A1 | 12/2015 | Choi et al. |

FOREIGN PATENT DOCUMENTS

| JP | 05-62504 A | 3/1993 |
| KR | 20050042145 A | 5/2005 |
| KR | 20120056794 A | 6/2012 |
| KR | 101306359 B1 | 9/2013 |
| KR | 20140086900 A | 7/2014 |

OTHER PUBLICATIONS

Extended European Search Report dated Nov. 14, 2018 for European Patent Application No. 16759135.3.
Chinese Office Action dated Sep. 16, 2019 for Chinese Patent Application No. 201680013412.6.

\* cited by examiner (a)

(b)

input of polarized light (c)

output of polarized light

COLOR GENERATION DEVICE HAVING FIRST AND SECOND BIREFRINGENCE MEDIA FOR GENERATING IMPROVED COLOR BY INCREASING TENDENCY OF LINEAR-POLARIZATION AND METHOD FOR THE SAME

TECHNICAL FIELD

The present invention relates to a color-generation device for generating improved color by use of polarization of light and birefringence and, more specifically, to the color-generation device for generating improved color that improves color generated on a display means to which a light made to have different polarization directions according to different wavelengths through birefringence is transmitted.

BACKGROUND

If a birefringence medium causing a light polarized by passing a first polarizing means to have different polarization directions according to wavelengths is arranged between the first polarizing means and a second polarizing means and a light is emitted to transmit through them in sequence, the light out through the second polarizing means presents color.

The present inventors have invented various display or illumination devices by using these phenomena and the inventions have been filed with Korean Patent Application Nos. 10-2012-0070627 (title of the invention: Polarization display device in which color and shape can be changeably viewed according to position of view), 10-2012-0070519 (title of the invention: Color change device by means of polarization) and 10-2011-0124247 (title of the invention: Polarization illumination system) so on.

In generating color by means of polarization of light in the field of the illumination or display, it is desirable if it is possible to generate various colors and chroma of the generated colors is high. For example, if a color-generation device is applied to an advertisement sign, it will attract more persons and achieve more advertisement effect as the chroma is getting higher and more various colors are getting generated.

The present inventors have tried their best efforts to develop an illumination or display device which generates color by means of polarization of light and to improve the quality of the generated color, and have filed Korean Patent Application No. 10-2013-0055010 (Title of the invention: Color-generation apparatus by means of polarization of light for generating color having high chroma or high concentration). This invention improves concentration or chroma of the generated color by arranging three polarizing means and, at least, two birefringence media.

The present inventors have found that, as for the light (visible light) entering the polarizing means at which color is to be generated after being polarized and passing through the birefringence medium, if the polarization states in the light according to the wavelengths are linear polarizations or even elliptical polarizations having high tendency of linear-polarization, it is helpful to generate the improved color. Whereas it is not helpful to generate the improved color if they are either circular polarizations or elliptical polarizations near to the circular polarizations. Accordingly, if it is possible to make the polarization states of the light according to the wavelengths have more linear polarizations or tendency of linear polarization higher and if it is possible to make the directions of the linear polarizations according to the wavelengths more different from one another, it is possible to generate more various colors and the generated color will be more improved.

Here, for instance, if the circular polarization state is put at one extreme and the linear polarization state is put at the other extreme, then, the states between the two extremes indicates elliptical polarization. The oscillation state becomes to be more linear towards the linear polarization state from the circular polarization state and it is said that the tendency of linear polarization is getting higher towards the linear polarization state from the circular polarization state.

Assuming that waves of two colors in the visible light are in the linear polarization states, if the directions of the polarizations of them are the same or are a little different even though they are not the same, the two colors according to the waves are mixed and it is difficult to generate the improved color. If the different colors according to the different wavelengths are in the linear polarization states, it is more helpful to improve the chroma and generate various colors as the polarization directions of them are more different from one another.

In this specification, description that "the tendency of linear-polarization of a light is increased" or "increase the tendency of linear polarization of a light" means to make the polarization states of the light according to wavelengths have higher tendency of linear-polarization according to wavelengths in overall and make the polarization directions according to wavelengths more different from one another.

The present inventors have tried to find a way to increase such a tendency of linear polarization of a light and the present invention is the result.

DETAILED DESCRIPTION OF THE INVENTION THE PROBLEM TO BE SOLVED

The purpose of the present invention is to provide a color-generation device for generating improved color and method for the same by increasing the tendency of linear polarization of a light. Also, another purpose of the present invention is to provide a means for increasing tendency of linear-polarization which can increase the tendency of linear-polarization of a light made to have different polarization directions according to wavelengths as the light has been polarized and, then, passed out through a birefringence medium.

Technical Solution

The present invention provides a color generation device for generating improved color by increasing tendency of linear polarization, comprising: means for increasing tendency of linear polarization receiving and passing out a linearly polarized light, which includes a first birefringence medium and a second birefringence medium; wherein, the first birefringence medium and the second birefringence medium are in the form of film, sheet or plate and excludes liquid crystal, the first birefringence medium and the second birefringence medium are arranged in series so that the linearly polarized light passes through them in sequence, the first birefringence medium is arranged for principal axes thereof not to be the same direction as the polarization direction of the linearly polarized light and not to be perpendicular to the polarization direction of the linearly polarized light, and phase retardation of the first birefringence medium is between 600 nm and 1400 nm with respect to visible light waves (400 nm to 700 nm) or with respect to visible light wave of 550 nm, the second birefringence means is arranged for either of the principal axes thereof to be within angle from −20° to 20° with respect to the polarization direction of the linearly polarized light received by the first birefringence medium, or, the second birefringence means is arranged for either of the principal axes thereof to be within angle from −20° to 20° with respect to the direction symmetric to the polarization direction of the linearly polarized light received by the first birefringence medium with respect to either of the principal axes and of the first birefringence medium, display means which reflects or passes a part of an incident light having a certain polarization direction from the incident light to be viewed by a user, positioned to be distanced from the means for increasing tendency of linear polarization and the linearly polarized light being transmitted thereto after passing through the means for increasing tendency of linear polarization.

According to the present invention, it is desirable that the phase retardation of the first birefringence medium is between 900 nm and 1200 nm with respect to visible light waves (400 nm to 700 nm) or with respect to visible light wave of 550 nm.

According to the present invention, it is desirable that the principal axes of the first birefringence medium are arranged to be at angle between 25° and 65° or between −25° and −65° with respect to the polarization direction of the linearly polarized light received by the first birefringence medium and it is more desirable that the principal axes of the first birefringence medium are arranged to be 45° or −45° with respect to the polarization direction of the linearly polarized light received by the first birefringence medium.

According to the present invention, it is desirable that the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

According to the present invention, it is desirable that the second birefringence medium is ¼λ retarder.

According to the present invention, it is desirable that the second birefringence medium is to cause the phase retardation between 100 nm and 180 nm with respect to the green wave (560 nm).

According to the present invention, it is desirable that the linearly polarized light is produced by passing a light from a light source through linear polarizing means and polarization direction of the linearly polarized light is polarization direction of the linear polarizing means. In this case, it is possible that the linear polarizing means, the first birefringence medium and the second birefringence medium are attached to each other in sequence through which the light emitted from the light source passes.

According to the present invention, the display means includes a base member and a polarizing means disposed on the base member.

According to the present invention, it is desirable that the polarizing means disposed on the base member is one selected from polarizing film, polarizing sheet or polarizing plate.

According to the present invention, it is possible that the polarizing means includes a plurality of polarization zones in which polarization directions of the adjoining polarization zones are different from each other.

According to the present invention, it is possible that the display mean is made of material such as liquid, glass, crystal, acryl, polycarbonate, transparent coating or other plastic, which is either translucent or transparent, through which a part of an incident light transmits out and on the surface of which a part of the incident light is reflected back.

According to the present invention, it is possible that the linear polarizing means, the first birefringence medium and the second birefringence medium through which the light emitted from the light source passes rotate all together.

According to the present invention, it is possible that a plurality of the light sources, a plurality of the polarizing means and a plurality of the means for increasing tendency of linear polarization are provided and a plurality of the light sources go on and off with respect to each other.

According to the present invention, it is desirable that the principal axes of the first birefringence medium and second birefringence medium are arranged at cross sections perpendicular to propagation direction of the light received thereby, respectively.

The present invention provides means for increasing tendency of linear polarization, which receives and passes out a linearly polarized light, comprising: a first birefringence medium; and a second birefringence medium; wherein, the first birefringence medium and the second birefringence medium are in the form of film, sheet or plate and excludes liquid crystal, the first birefringence medium and the second birefringence medium are arranged in series so that the linearly polarized light passes through them in sequence, the first birefringence medium is arranged for principal axes thereof not to be the same direction as the polarization direction of the linearly polarized light and not to be perpendicular to the polarization direction of the linearly polarized light, and phase retardation of the first birefringence medium is between 600 nm and 1400 nm with respect to visible light waves (400 nm to 700 nm) or with respect to visible light wave of 550 nm, the second birefringence means is arranged for either of the principal axes thereof to be within angle from −20° to 20° with respect to the polarization direction of the linearly polarized light received by the first birefringence medium, or, within angle from −20° to 20° with respect to the direction symmetric to the polarization direction of the linearly polarized light received by the first birefringence medium with respect to either of the principal axes and of the first birefringence medium.

According to the present invention, it is desirable that the phase retardation of the first birefringence medium is between 900 nm and 1200 nm with respect to visible light waves (400 nm to 700 nm) or with respect to visible light wave of 550 nm.

According to the present invention, it is desirable that the principal axes of the first birefringence medium are arranged to be at angle between 25° and 65° or between −25° and −65° with respect to the polarization direction of the linearly polarized light received by the first birefringence medium and it is more desirable that the principal axes of the first birefringence medium are arranged to be 45° or −45° with respect to the polarization direction of the linearly polarized light received by the first birefringence medium.

According to the present invention, it is desirable that the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

According to the present invention, it is desirable that the second birefringence medium is ¼λ retarder.

According to the present invention, it is desirable that the second birefringence medium is to cause the phase retardation between 100 nm and 180 nm with respect to the green wave (560 nm).

According to the present invention, it is desirable that the linearly polarized light is produced by passing a light from a light source through linear polarizing means and polarization direction of the linearly polarized light is polarization direction of the linear polarizing means, and it is more desirable that the first birefringence medium and the second birefringence medium are attached to each other in sequence through which the light emitted from the light source passes.

According to the present invention, it is desirable that the principal axes of the first birefringence medium and second birefringence medium are arranged at cross sections perpendicular to propagation direction of the light received thereby, respectively.

The present invention also provides a color generation device for generating improved color by increasing tendency of linear polarization, comprising: means for increasing tendency of linear polarization receiving and passing out a linearly polarized light, which includes a first birefringence medium and a second birefringence medium; wherein, the first birefringence medium and the second birefringence medium are in the form of film, sheet or plate and excludes liquid crystal, the first birefringence medium and the second birefringence medium are arranged in series so that the linearly polarized light passes through them in sequence, the principal axes of the first birefringence medium are arranged to be at angle between 25° and 65° or between −25° and −65° with respect to the polarization direction of the linearly polarized light received by the first birefringence medium, the second birefringence means is arranged for either of the principal axes thereof to be within angle from −20° to 20° with respect to the polarization direction of the linearly polarized light received by the first birefringence medium, or, within angle from −20° to 20° with respect to the direction symmetric to the polarization direction of the linearly polarized light received by the first birefringence medium with respect to either of the principal axes and of the first birefringence medium, and display means which reflects or passes a part of an incident light having a certain polarization direction from the incident light to be viewed by a user, positioned to be distanced from the means for increasing tendency of linear polarization and the linearly polarized light being transmitted thereto after passing through the means for increasing tendency of linear polarization.

According to the present invention, it is desirable that the principal axes of the first birefringence medium are arranged to be 45° or −45° with respect to the polarization direction of the linearly polarized light received by the first birefringence medium.

According to the present invention, it is desirable that the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

According to the present invention, it is desirable that the second birefringence medium is ¼λ retarder.

According to the present invention, it is desirable that the second birefringence medium is to cause the phase retardation between 100 nm and 180 nm with respect to the green wave (560 nm).

According to the present invention, it is desirable that the principal axes of the first birefringence medium and second birefringence medium are arranged at cross sections perpendicular to propagation direction of the light received thereby, respectively.

The present invention further provides means for increasing tendency of linear polarization, which receives and passes out a linearly polarized light, comprising: a first birefringence medium; and a second birefringence medium; wherein, the first birefringence medium and the second birefringence medium are in the form of film, sheet or plate and excludes liquid crystal, the first birefringence medium and the second birefringence medium are arranged in series so that the linearly polarized light passes through them in sequence, the principal axes of the first birefringence medium are arranged to be at angle between 25° and 65° or between −25° and −65° with respect to the polarization direction of the linearly polarized light received by the first birefringence medium, and, the second birefringence means is arranged for either of the principal axes thereof to be within angle from −20° to 20° with respect to the polarization direction of the linearly polarized light received by the first birefringence medium, or, within angle from −20° to 20° with respect to the direction symmetric to the polarization direction of the linearly polarized light received by the first birefringence medium with respect to either of the principal axes and of the first birefringence medium.

According to the present invention, it is desirable that the principal axes of the first birefringence medium are arranged to be 45° or −45° with respect to the polarization direction of the linearly polarized light received by the first birefringence medium.

According to the present invention, it is desirable that the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

According to the present invention, it is desirable that the second birefringence medium is ¼λ retarder.

According to the present invention, it is desirable that the second birefringence medium is to cause the phase retardation between 100 nm and 180 nm with respect to the green wave (560 nm).

According to the present invention, it is desirable that the principal axes of the first birefringence medium and second birefringence medium are arranged at cross sections perpendicular to propagation direction of the light received thereby, respectively.

The present invention further provides a method for increasing tendency of linear polarization comprising: a step that a linearly polarized light is transmitted to the first birefringence medium and passes therethrough; and a step that the light transmitted to the first birefringence medium and passed out therethrough is transmitted to the second birefringence medium and passes therethrough; wherein, the principal axes of the first birefringence medium are arranged to be at angle between 25° and 65° or between −25° and −65° with respect to the polarization direction of the linearly polarized light transmitted to the first birefringence medium, and, the second birefringence means is arranged for either of the principal axes thereof to be within angle from −20° to 20° with respect to the polarization direction of the linearly polarized light transmitted to the first birefringence medium, or, within angle from −20° to 20° with respect to the direction symmetric to the polarization direction of the linearly polarized light transmitted to the first birefringence medium with respect to either of the principal axes and of the first birefringence medium, the first birefringence medium and the second birefringence medium are in the form of film, sheet or plate and excludes liquid crystal and made of natural resin or plastic.

According to the present invention, it is desirable that the principal axes of the first birefringence medium are arranged to be 45° or −45° with respect to the polarization direction of the linearly polarized light received by the first birefringence medium.

According to the present invention, it is desirable that the second birefringence medium is arranged for either of the principal axes thereof to coincide with the polarization direction of the linearly polarized light transmitted to the first birefringence medium or to coincide with a direction symmetric to the polarization direction of the linearly polarized light transmitted to the first birefringence medium with respect to either of the principal axes of the first birefringence medium.

According to the present invention, it is desirable that the second birefringence medium is ¼λ retarder.

According to the present invention, it is desirable that the principal axes of the first birefringence medium and second birefringence medium are arranged at cross sections perpendicular to propagation direction of the light transmitted thereto, respectively.

Advantageous Effects

According to the present invention, a linearly polarized light passes through the first birefringence medium to have the different polarization directions according to the wavelengths, and then the light passed out from the first birefringence medium passes through the second birefringence medium so that the tendency of linear polarization is increased. That is, there increases light waves the tendency of linear polarization of which are high and the polarization directions according to the wavelengths become different from one another. Therefore, at the display means receiving the light in which the tendency of linear-polarization is maximized, chroma of color displayed becomes improved and it is possible to generate various colors.

MODE FOR INVENTION

Now, the preferred embodiment of the present invention will be explained in detail with reference to the accompanying drawings.

Figure 1:
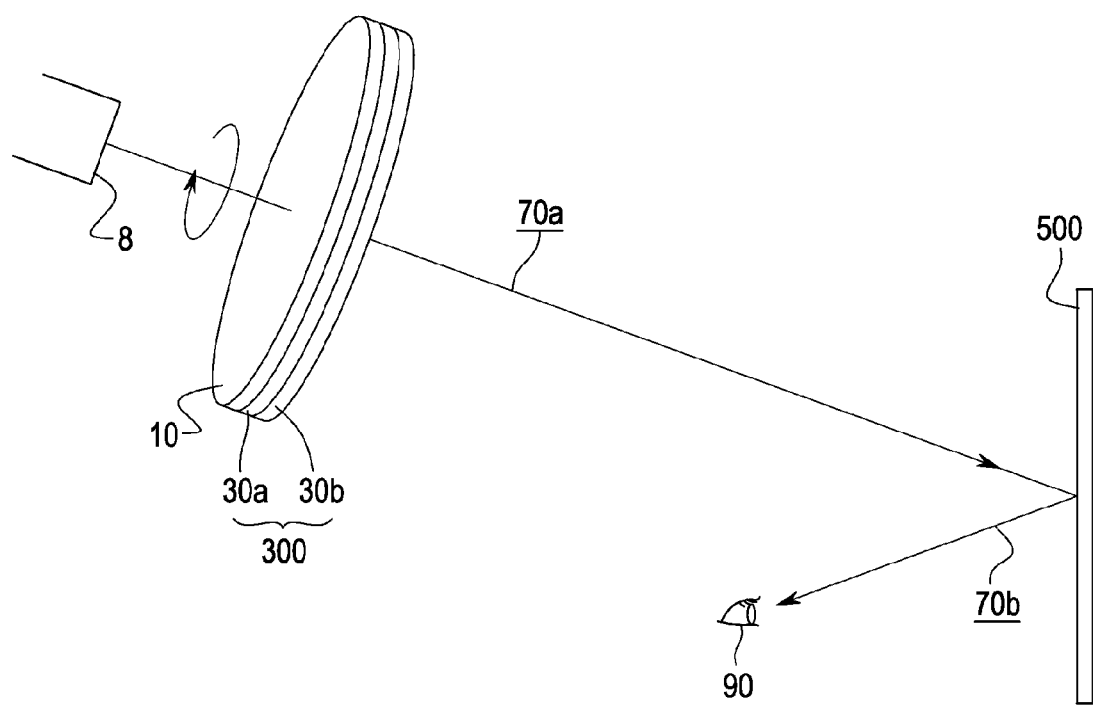
FIG. 1 shows a color-generation device for generating improved color by increasing tendency of linear-polarization according to an embodiment of the present invention.

FIG. 1 shows a color-generation device 1000 which increases tendency of linear-polarization to generate improved color according to an embodiment of the present invention.

As shown, a light source 8 is provided and, with reference to the propagation direction of the emitted light from the light source 8, linear polarizing means 10 is arranged in the front of the light source 8 and a first birefringence medium 30a and a second birefringence medium 30b are arranged in series in front of the linear polarizing means 10.

The linear polarizing means 10 is to linearly polarize the light from the light source 8 as it receives and passes the light from the light source 8. It includes a polarization film, a polarization sheet or a polarization plate, which is generally used to linearly polarize a light.

The first birefringence medium 30a and the second birefringence medium 30b are to double refract a light as it receives and passes the light. The first birefringence medium 30a and the second birefringence medium 30b include film, sheet or plate in shape and excludes liquid crystal. They can be made of plastics such as PP, PET or PC or they can be made of natural resin such as cellophane or made of minerals or natural glasses.

The first birefringence medium 30a and the second birefringence medium 30b constitute a means for increasing tendency of linear-polarization 300 according to the present invention.

The light emitted from the light source 8 is linearly polarized as it passes through the linear polarization means 10 and then the linearly polarized light passes through the first birefringence medium 30a and the second birefringence medium 30b in sequence.

In this embodiment, the linear polarization means 10, the first birefringence medium 30a and the second birefringence medium 30b are attached to each other in sequence and the linear polarization means 10, the first birefringence medium 30a and the second birefringence medium 30b rotate all together.

The rotation is made with respect to the direction (optic axis) that the light from the light source 8 propagates. That means, the optic axis becomes the rotational axis. By this rotation, the color generated on a display means changes as described later.

The light emitted from the light source 8 passes through the linear polarization means 10 and it is linearly polarized. The linearly polarized light, then, passes through the means for increasing tendency of linear-polarization 300. That means, it passes through the first birefringence medium 30a and second birefringence medium 30b in series. Then, the light is transmitted to a display means 500.

The display means 500 is to polarize an incident light and view the polarized light to a user and includes such a thing having a base member and a polarizing means on the base member. The polarizing means includes polarizing film, polarizing sheet or polarizing plate.

The base member can be opaque, translucent or transparent.

In the display means 500, a light passes through the polarizing means and is reflected back on the base member, and then, passes out through the polarizing means again (if the base member is opaque or translucent). A light passes through the polarizing means and passes out through the base member (if the base member is translucent or transparent). The user views the light out from the display means 500. If the base member is translucent, a part of the light is reflected back and passes out through the polarizing means and a part of the light passes out through the base member.

Figure 2:
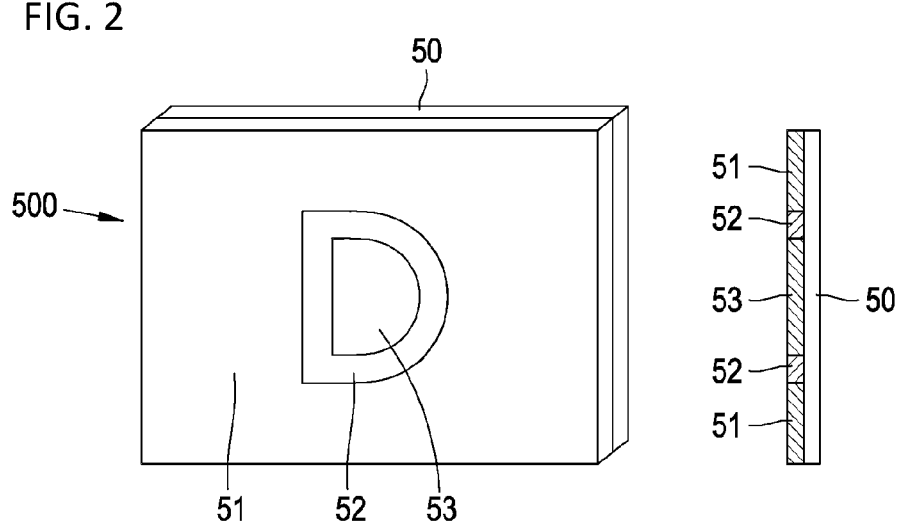
FIG. 2 shows an example of the display means.
Figure 3:
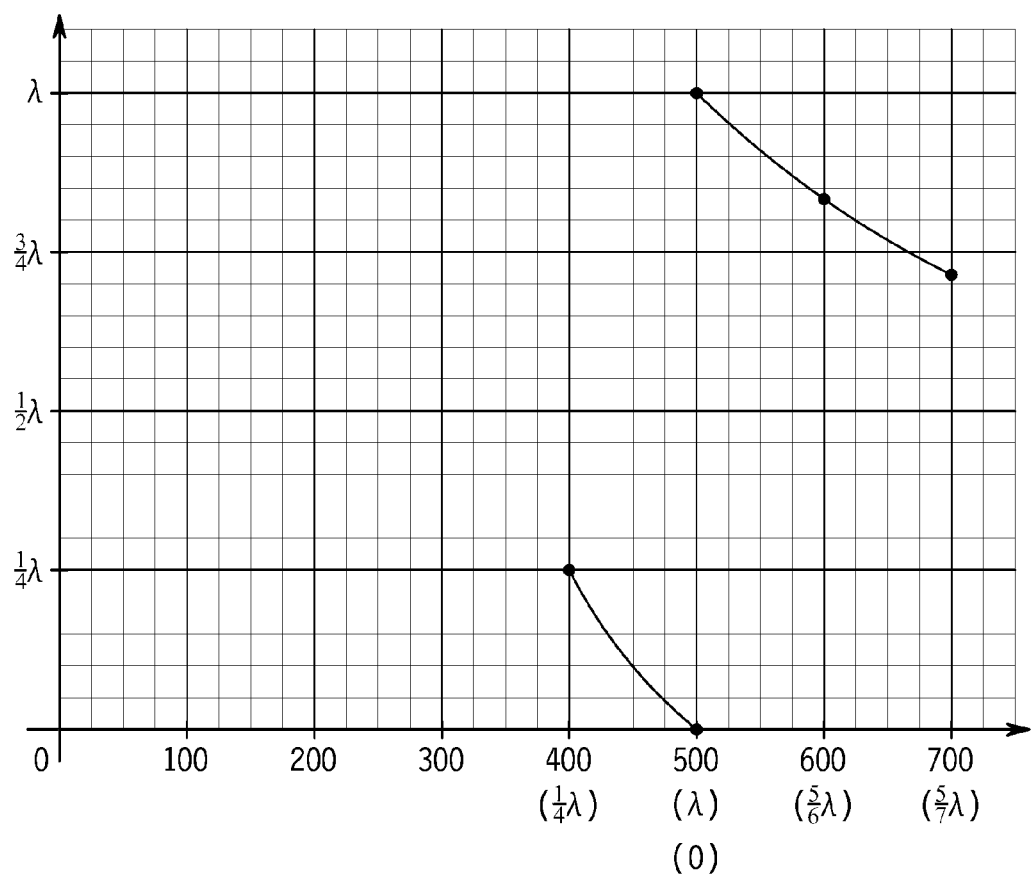
FIGS. 3 to 8 show phase-retardation by wavelength according to wavelengths in the range of the visible light (400 nm to 700 nm) in case that the phase retardation of the birefringence medium is 500 nm, 600 nm, 700 nm, 800 nm, 900 nm and 1000 nm, respectively.
Figure 4:
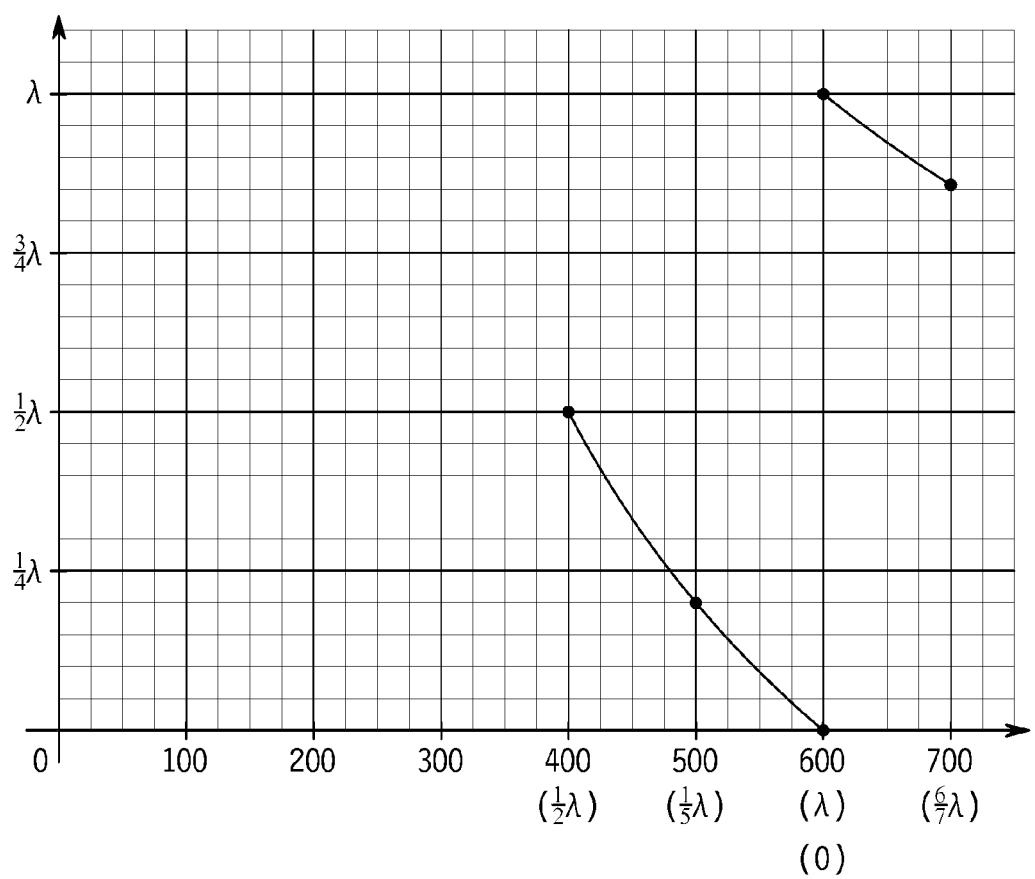
Figure 5:
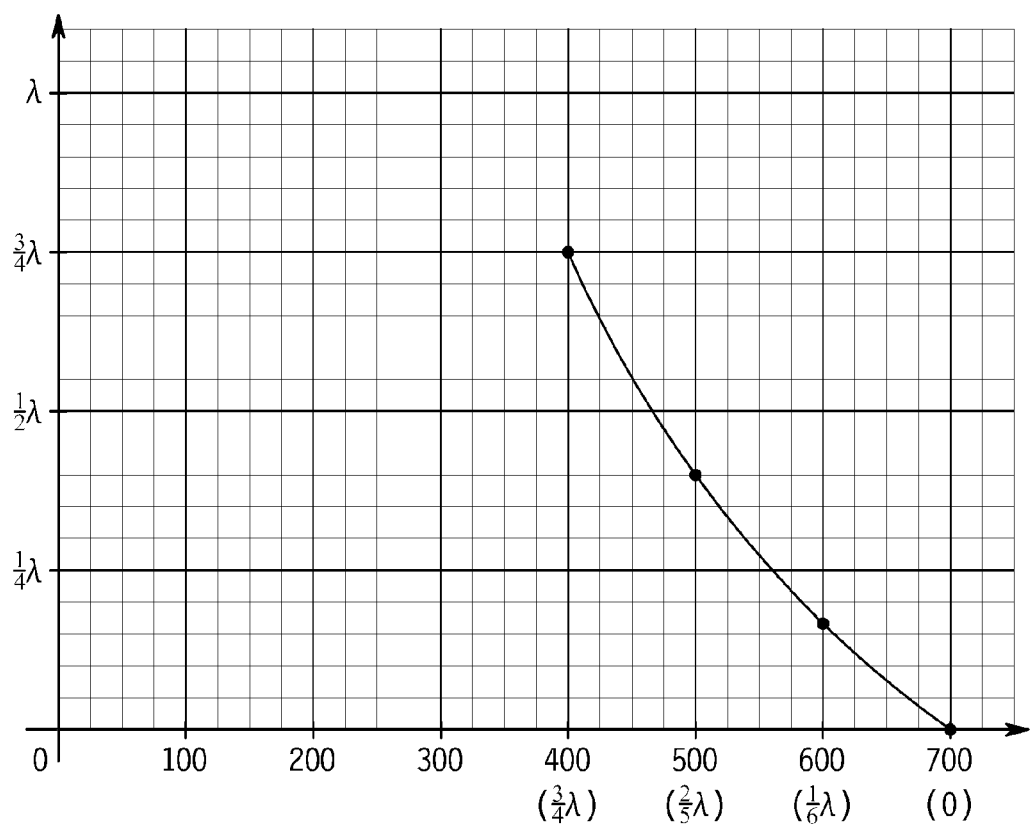
Figure 6:
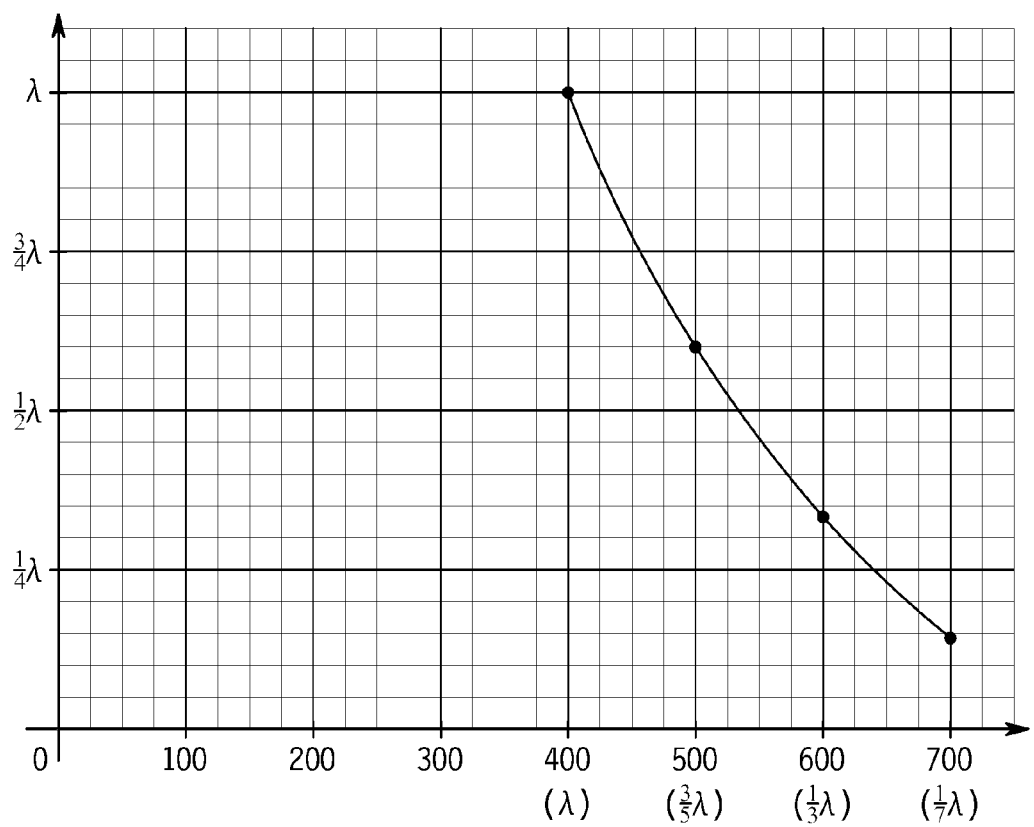
Figure 7:
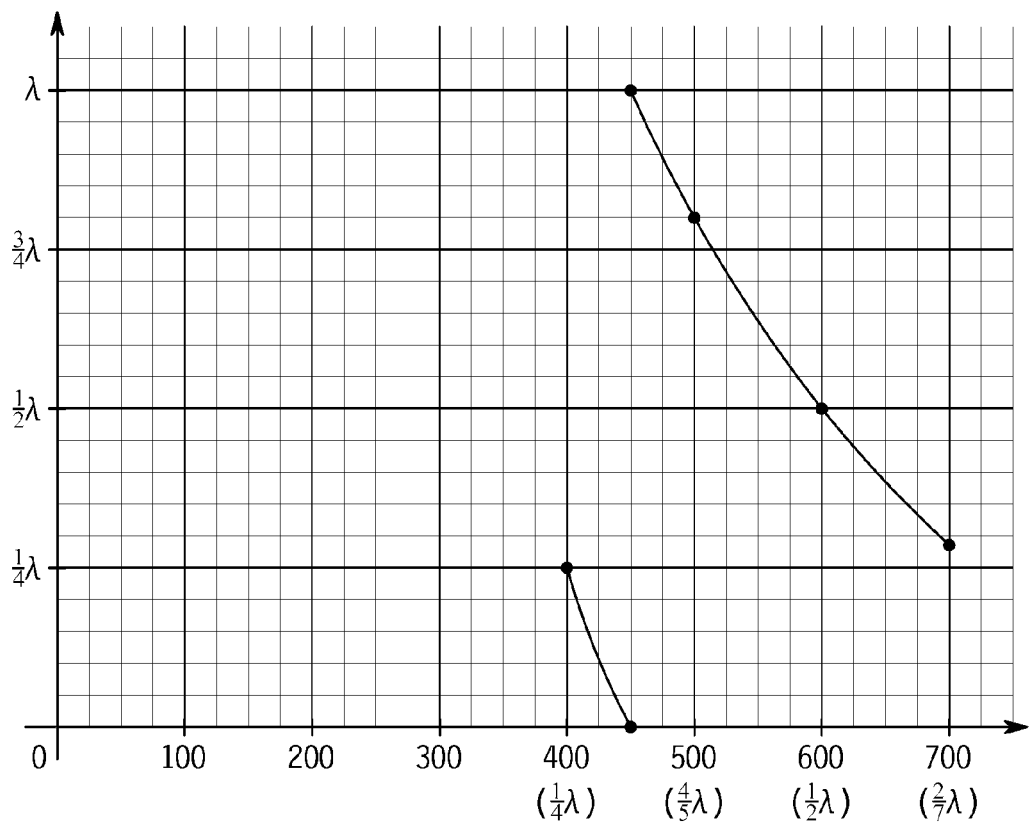
Figure 8:
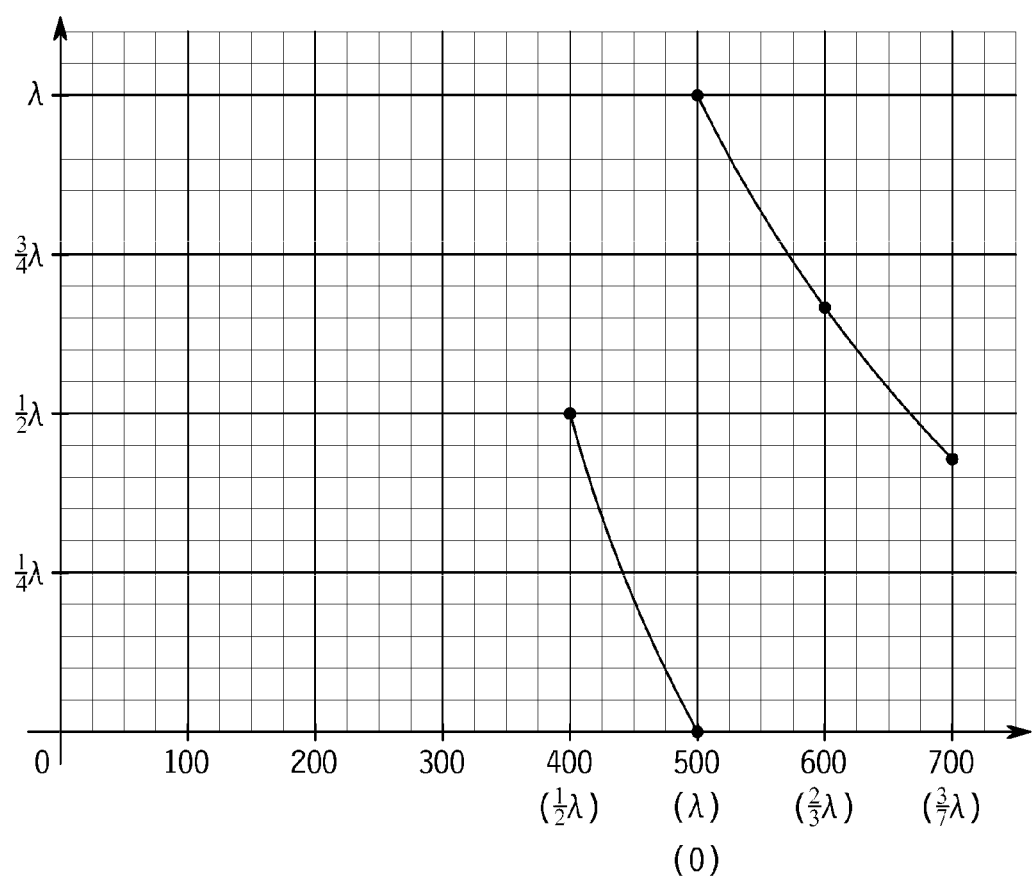

FIG. 2 shows an example of the display means 500.

As shown, the base member 50 is provided and a polarizing film (that is the polarizing means) is provided on the base member 50.

In this case, the polarizing film has a plurality of polarization zones 51, 52 and 53 and the polarization directions of the polarization zones 51, 52 and 53 are different from one another.

The polarization zones 51, 52 and 53 can constitute a shape such as letter, pattern or character and this figure shows that they constitute the letter of D.

As described above, the display means 500 is to polarize an incident light and view the polarized light to the user. In connection with things through which a part of an incident light transmits out and on the surface of which a part of the incident light is reflected back at the same time, all or a part of the reflected light is polarized according to the incident, reflection and refraction angles. Accordingly, medium made of materials such as glass, acryl, polycarbonate, crystal or other plastic, through which a part of an incident light transmits out and on the surface of which a part of the incident light is reflected back at the same time, can be the display means 500 according to the present invention. For example, glass plate, sculpture made of crystal, transparent film, or liquid such as water can be the display means 500 according to the present invention.

The light which has been linearly polarized and then passed through the means for increasing tendency of linear-polarization 300 is transmitted to the display means 500. According to the present invention, the means for increasing tendency of linear-polarization 300 and the display means 500 are distanced from each other. The display means 500 reflects or passes a part of the light having a certain polarization direction selectively from the incident light to view it to the user and achieves display.

FIG. 1 shows that the light 70a which has passed through linear polarizing means 10 and then passed through the means for increasing tendency of linear-polarization 300 is transmitted to the display means 500. This light 70a is polarized and reflected back at the display means 500 and the user views the light polarized and reflected back at the display means 500.

At this time, color is generated and viewed at the display means 500 and if the linear polarization means 10, the first birefringence medium 30a and the second birefringence medium 30b are rotated all together, the generated color at the display means 500 changes. If the display means 500 has a plurality of zones in which the polarization directions of the adjoining zones are different from each other, different colors are generated at the different adjoining zones and each of the generated colors changes.

In case that the display means 500 includes the base member and the polarizing means disposed thereon such as the polarizing film, polarizing sheet or polarizing plate as shown in FIG. 2, if the linear polarization means 10, the first birefringence medium 30a and the second birefringence medium 30b are stationery and the display means 500 rotates, the generated color at the display means 500 changes. If the polarizing means on the display means 500 has a plurality of zones in which the polarization directions of the adjoining zones are different from each other, different colors are generated at the different adjoining zones and each of the generated colors changes.

According to the present invention, principal axes of the first birefringence medium 30a are not the same as (parallel with) the polarization direction of the linearly polarized light and are not perpendicular to the polarization direction of the linearly polarized light. It is preferable that the phase-retardation of the first birefringence medium 30a is in the range between 600 nm and 1400 nm with respect to the wavelength of the visible light (700 nm from 400 nm).

Among birefringence media, in uniaxial crystal, if optic axis is included in a plane, polarization directions making ordinary ray (ordinary wave) and extraordinary ray (extraordinary wave) are perpendicular to each other and the two polarization directions are referred to principle axes of the crystal. The principle axes are divided into fast axis and slow axis and the fast axis and the slow axis are perpendicular to each other. It is desirable that the fast axis and the slow axis are included in the same plane if the medium is film, sheet or plate type.

Among birefringence media, in biaxial crystal, there are two optic axes and three principal axes. The refractive indices (velocity of light) are different from one another with respect to the three principal axes. In this kind of the birefringence medium, in case that a light passes through a plane including the two principal axes along the direction of the rest one principal axis, if the propagation of the light polarized to the direction of the one principal axis of the two principal axes in the plane is faster than the propagation of the light polarized to the direction of the rest one principal axis of the two principal axes in the plane, the two principal axes in the plane are regarded as the fast axis and the slow axis, respectively and these two principal axes are perpendicular to each other.

In the biaxial crystal as above, even though the light does not pass along the direction of one principal axis among the three principal axes, in case that polarization directions making two rays (ordinary ray, extraordinary ray or there may be two extraordinary rays in case of the biaxial crystal) occurring as the light propagates are perpendicular to each other, if one of them is faster than the other, the polarization direction of them can be regarded as the fast axis and the slow axis, respectively.

According to the present invention, the first birefringence medium 30a and the second birefringence medium 30b may be either the uniaxial crystals or biaxial crystals. It is desirable that the principal axes are included in the plane in case of the uniaxial crystals. It is desirable that the polarized light passes through the plane including the two principal axes among the three principal axes along the direction of the rest one principal axis in case of the biaxial crystals.

Also, it is desirable that the first birefringence medium and the second birefringence medium are in the form of film, sheet or plate. The plane including the optic axis, fast axis and slow axis in case of uniaxial crystals and the plane including two principal axes among the three principal axes in case of biaxial crystals constitute a face that does not constitute a thickness in the form of plate.

Birefringence media artificially produced by extending synthetic resin or natural resin are almost in the form of plat and it is general that the plane including the optic axis, fast axis and slow axis in case of uniaxial crystal and the plane including two principal axes among the three principal axes in case of biaxial crystal constitute a face that does not constitute a thickness in the form of plate.

And, it is desirable that the first birefringence medium and the second birefringence medium in the form of plate are arranged for the plane including the two principal axes to be perpendicular to the propagation direction of the light.

The following will describe the invention based on the desirable cases.

And, in the uniaxial crystal, the fast axis and the slow axis are referred as "the principal axes", and, in the biaxial crystal, the rest two principal axes on cross section perpendicular to the propagation direction of the light other than the principal axis along the propagation direction of the light are regarded as the fast axis and the slow axis, respectively, and referred as "the principal axes".

Accordingly, the first birefringence medium $30a$ and the second birefringence medium $30b$ have the principal axes on cross sections perpendicular to the propagation directions of the incident lights thereto, respectively.

The first birefringence medium $30a$ is arranged for either of the principal axes thereof not to be the same direction as the polarization direction of the linearly polarized light transmitted thereto so that the linearly polarized light transmitted to the first polarizing means $30a$ experiences phase-retardation according to the wavelengths. It is desirable that the phase-retardation in the first birefringence medium $30a$ is in the range between 600 nm and 1400 nm with respect to the wavelength range (400 nm to 700 nm) of the visible light.

The visible light is a light the wavelength of which is generally between 400 nm (violet) and 700 nm (red). FIGS. 3 to 8 show phase-retardation by wavelength (that is, phase-retardation with ratio to wavelength $\lambda$(lambda)) according to the wavelengths in the range of the visible light (400 nm to 700 nm) in case that the phase retardation of the birefringence medium is 500 nm, 600 nm, 700 nm, 800 nm, 900 nm and 1000 nm, respectively. When phase retardation occurs by means of the birefringence medium, the phase-retardations by wavelength according to the wavelengths of the visible light are different from one another and the phase-retardations by wavelength according to the wavelengths of the visible light change as the phase-retardation of the birefringence medium changes.

Reviewing it, it is recognized that there occurs, at least, one phase-retardation of $½\lambda$ when the phase retardation of the birefringence medium becomes 600 nm or over. For example, when the phase retardation of the birefringence medium is 600 nm, there is phase retardation of $½\lambda$ with respect to the wavelength of 400 nm of the violet wave and, at the same time, there is phase retardation of $\lambda$ with respect to the wavelength of 600 nm. Also, it is recognized that phase retardations of $½\lambda$ or $\lambda$ are not found within the range of the visible light if the phase retardation of the birefringence medium is less than 600 nm.

The present invention is to make the polarization states according to wavelengths have higher tendency of linear polarization and it is desirable if there are more linear polarizations according to wavelengths. If the phase retardation by wavelength is $½\lambda$, $\lambda$ or 0, it means that the wave becomes the linear polarization state. Then, the fact that there are no retarded waves by $½\lambda$ or $\lambda$ means that there are no linear-polarization state wavelengths corresponding to the phase retardation of the birefringence medium among the visible light waves having passed through the first birefringence medium $30a$.

Accordingly, the phase-retardation of the first birefringence medium $30a$ should be more than 600 nm so that there are more than two visible light waves to be the linear polarization states by the phase-retardation. In this case, the waves to be retarded by $½\lambda$ and $\lambda$ have different polarization directions, respectively.

Next, as the phase-retardation of the birefringence medium increases, the phase-retardations by wavelength according to wavelengths are well evenly distributed. From, FIGS. 3 to 8, as the phase-retardation of the birefringence medium increases along 600 nm, 700 nm, 800 nm, 900 nm and 1000 nm, it is seen that the phase-retardations by wavelength according to wavelengths are well evenly distributed.

Basically, it is desirable if the phase-retardations by wavelength according to wavelengths are well evenly distributed in the overall range of the visible light wavelengths because it can make it possible generate various colors.

However, if the phase-retardations of the birefringence medium reaches 1000 nm over 900 nm, there occurs the part where the phase-retardations by wavelength according to wavelengths are overlapped. The fact that the phase-retardations by wavelength according to wavelengths are overlapped means that the polarization states are the same even though they are different colors and they are mixed to result in lower chroma color when generated in the display means 500.

Accordingly, it is desirable for the phase-retardations by wavelength according to wavelengths to be well evenly distributed and not to be overlapped and it is necessary to select optimum value based thereon.

From this point of view, the phase-retardation that makes the red 700 nm which is the longest wave in the range of the visible light waves retarded by $2\lambda$ is 1400 nm and it is bad if the phase-retardation is over 1400 nm because the overlapped parts becomes overly increased. Accordingly, as upper limit, it is desirable that the phase-retardation of the first birefringence medium $30a$ is 1400 nm.

Especially, according to the sensory experiment by the inventors, when the phase-retardation of the first birefringence medium $30a$ is between 900 nm and 1200 nm, the chroma is the best.

Accordingly, it is desirable that the phase-retardation of the first birefringence medium $30a$ is between 600 nm and 1400 nm for the visible light waves and it is more desirable if it is between 900 nm and 1200 nm.

Especially, when the phase-retardation of the first birefringence medium $30a$ is 933.33 nm, the phase-retardations by wavelength according to wavelengths in the range of visible light waves (400 nm to 700 nm) are the most evenly distributed. Accordingly, it is the most preferable if the phase-retardation of the first birefringence medium $30a$ is 933.33 nm.

With respect to the visible light waves, the phase-retardation of the first birefringence medium $30a$ is between 600 nm and 1400 nm and, preferably, between 900 nm and 1200 nm. However, for convenience sake, it is possible to be with respect to 550 nm that is the mid-point of the range of visible light waves because refractive index (the velocity of the light wave in a medium) in the medium may be slightly different according to the visible light waves or what the medium is.

Accordingly, according to the present invention, it is possible to state that with respect to the visible light wave of 550 nm, the phase-retardation of the first birefringence medium 30a is between 600 nm and 1400 nm and, preferably, between 900 nm and 1200 nm.

Figure 10:
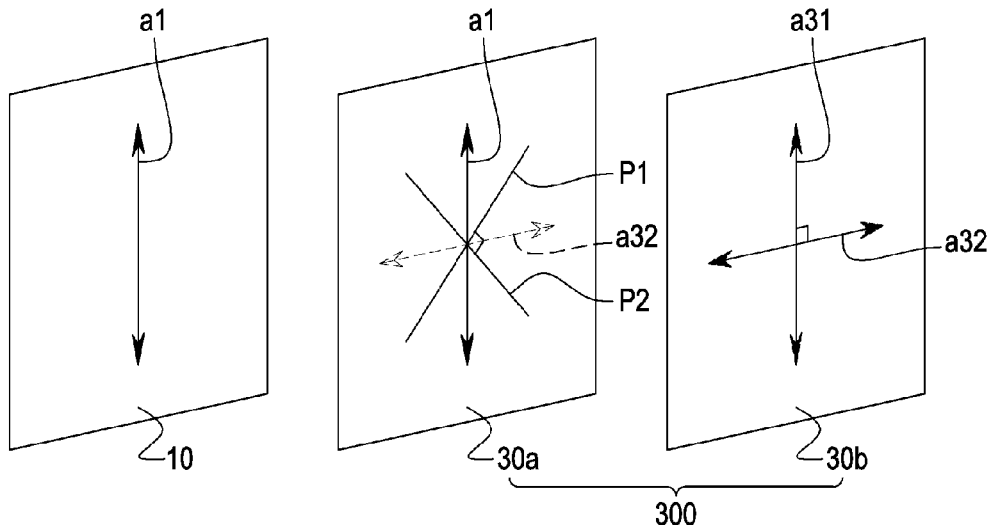
Figure 10:
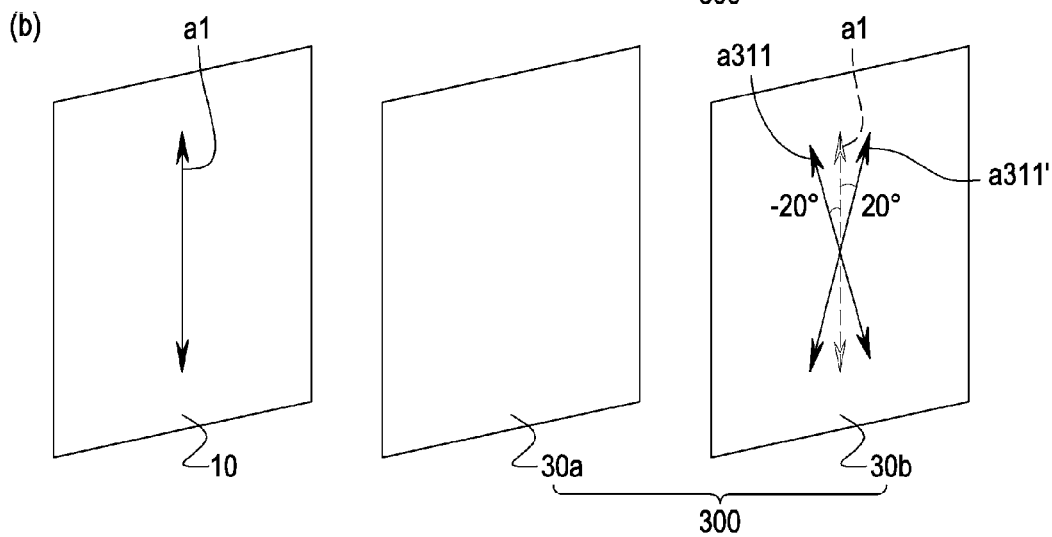
Figure 10:
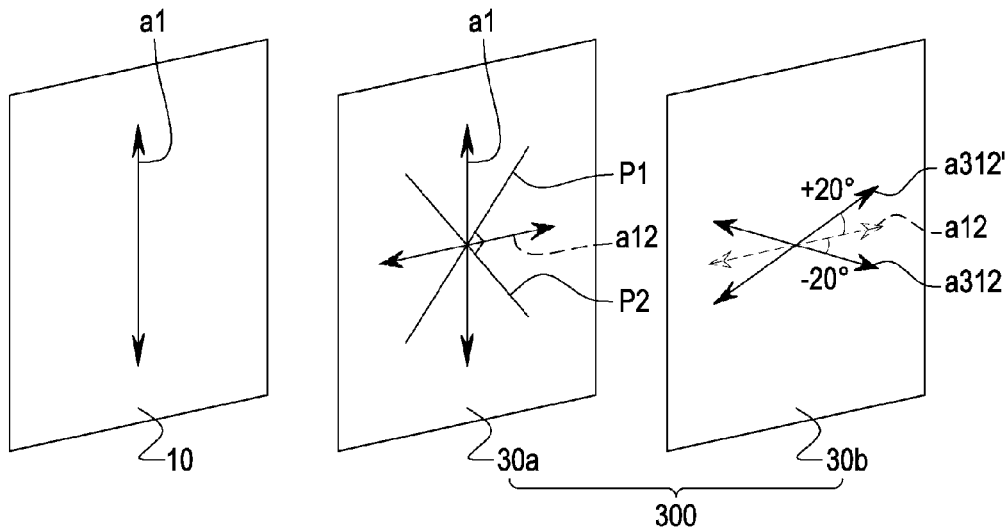

Also, according to the present invention, it is desirable that the second birefringence medium 30b is arranged for either of the principal axes thereof to be within angle from −20° to 20° with respect to the polarization direction of the linearly polarized light transmitted to the first birefringence medium 30a (FIG. 10(b)), or, to be within angle from −20° to 20° with respect to a direction symmetric to the polarization direction of the linearly polarized light transmitted to the first birefringence medium 30a with respect to either of the principal axes of the first birefringence medium 30a (FIG. 10(c)). More preferably, the second birefringence medium 30b is arranged for either of the principal axes thereof to coincide with the polarization direction of the linearly polarized light transmitted to the first birefringence medium 30a or to coincide with a direction symmetric to the polarization direction of the linearly polarized light transmitted to the first birefringence medium 30a with respect to either of the principal axes of the first birefringence medium 30a (FIG. 10(a)).

Figure 9:
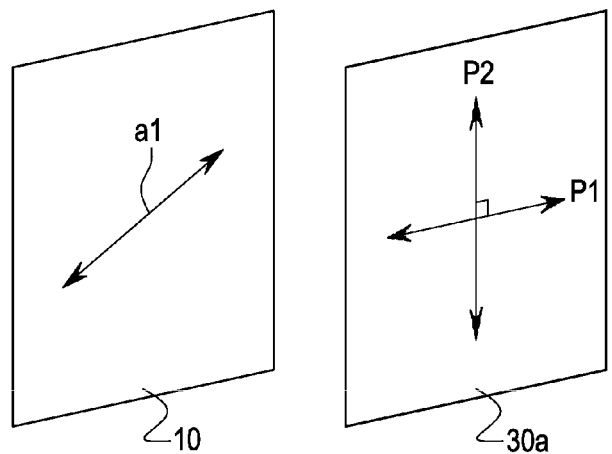
FIGS. 9 and 10 show arrangement condition of principal axes of a second birefringence medium.
Figure 9:
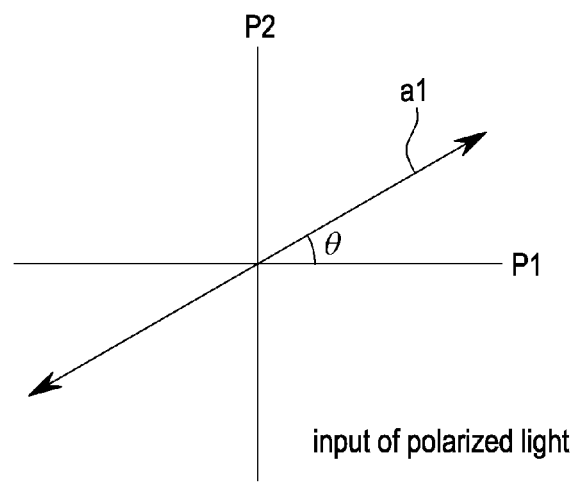
Figure 9:
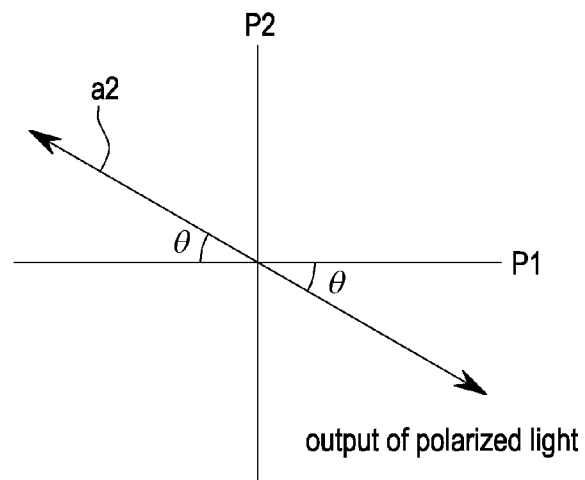

With reference to FIG. 9, when a light (visible light) that has passed through the polarizing means 10 the polarization direction of which is a1 and then has the polarization direction a1 passes through the first birefringence medium 30a the principal axes of which are p1 and p2, wave the phase-retardation of which is λ keeps the same polarization direction a1 as that of the input polarized light whereas wave the phase-retardation of which is ½λ comes to have polarization direction symmetric with respect to either of the principal axes p1 and p2.

That is, when the input polarized light the polarization direction of which is a1 passed the first birefringence medium 30a (refer to FIG. 9(b)), the wave the phase-retardation of which is ½λ comes to have polarization direction symmetric to the polarization direction a1 with respect to either of the principal axes p1 and p2. (refer to FIG. 9(c))

With reference to FIG. 10(a), the polarization direction of the linear polarizing means 10 is a1, one direction of the principal axes of the second birefringence medium 30b is a31 that coincide with the polarization direction a1 or is a32 that is symmetric to the polarization direction a1 with respect to either of the principal axes p1 and p2 of the first birefringence medium.

When angle between the polarization direction of the linear polarizing means and the principal axes of the first birefringence means is 45° or −45°, the original linear polarization direction(λ) and a direction (½λ) symmetric thereto with respect to either of the principal axes p1 and p2 of the first birefringence medium are perpendicular to each other. Accordingly, if either of the principal axes p1 and p2 of the second birefringence medium is arranged to coincide with the polarization direction of the linear polarizing means, the rest one principal axis of the second birefringence medium becomes the direction (½λ) symmetric thereto with respect to either of the principal axes p1 and p2 of the first birefringence and becomes to coincide with the direction perpendicular to the polarization direction of the linear polarizing means.

As such, if the principal axes a31 and a32 of the second birefringence medium 30b is arranged to coincide with the polarization direction a1 of the linearly polarized light transmitted to the first birefringence medium 30a or arranged to coincide with the direction a32 symmetric to the polarization direction a1 of the linearly polarized light transmitted to the first birefringence medium 30a with reference to the principal axes p1 and p2 of the first birefringence medium 30a, the principal axes p1 and p2 of the second birefringence medium 30b become to coincide with the polarization directions of the waves the phase retardation of which is λ or ½λ, respectively and the waves the phase retardation of which is λ or ½λ pass through the second birefringence medium 30b without the phase retardation.

As such, if the angle between the polarization direction of the linear polarizing means and the principal axes of the first birefringence medium is 45° or −45° and either of principal axes of the second birefringence medium is arranged to coincide with the polarization direction of the original linear polarizing means, both of the waves the phase retardation of which are λ and ½λ pass through the second birefringence medium 30b without the phase retardation.

Thus, the linearly polarized light produced by passing through the first birefringence mean 30a keeps the linear polarization as it passes through the second birefringence means 30b and it is possible to transform a circularly polarized light into a linearly polarized light without affecting the already existing linearly polarized light.

With reference to FIG. 10(b), the second birefringence means 30b is arranged for either of the principal axes thereof to be within angle from −20° (a311') to 20° (a311) with respect to the polarization direction of the linearly polarized light transmitted to the first birefringence medium 30a. Or with reference to FIG. 10(c), the second birefringence means 30b is arranged for either of the principal axes thereof to be within angle from −20° (a312) to 20° (a312') with respect to the direction symmetric to the polarization direction a1 of the linearly polarized light transmitted to the first birefringence medium 30a with respect to either of the principal axes p1 and p2 of the first birefringence medium 30a.

Although that the principal axes of the second birefringence medium 30b coincide with the polarization direction a1 of the linear polarizing means or the direction symmetric to the polarization direction a1 of the linear polarizing means with respect to the principal axes of the first birefringence medium 30a is the most desirable because it is possible to keep the linear polarization produced by passing through the first birefringence medium 30a, it is also desirable if the directions of the principal axes of the second birefringence medium 30b is within the angle from −20° to 20° as described above. This is based on the sensory experiment in which the chroma is well kept without being lowered sharply.

According to the present invention, it is desirable that the first birefringence medium 30a is arranged to be within angle from 25° to 65° with respect to the polarized direction a1 of the light transmitted thereto or to be within angle from −25° to −65° with respect to the polarized direction a1 of the light transmitted thereto. The most desirable case is that the first birefringence medium 30a is arranged to be at 45° or −45° with respect to the polarized direction a1 of the light transmitted thereto.

Figure 12:
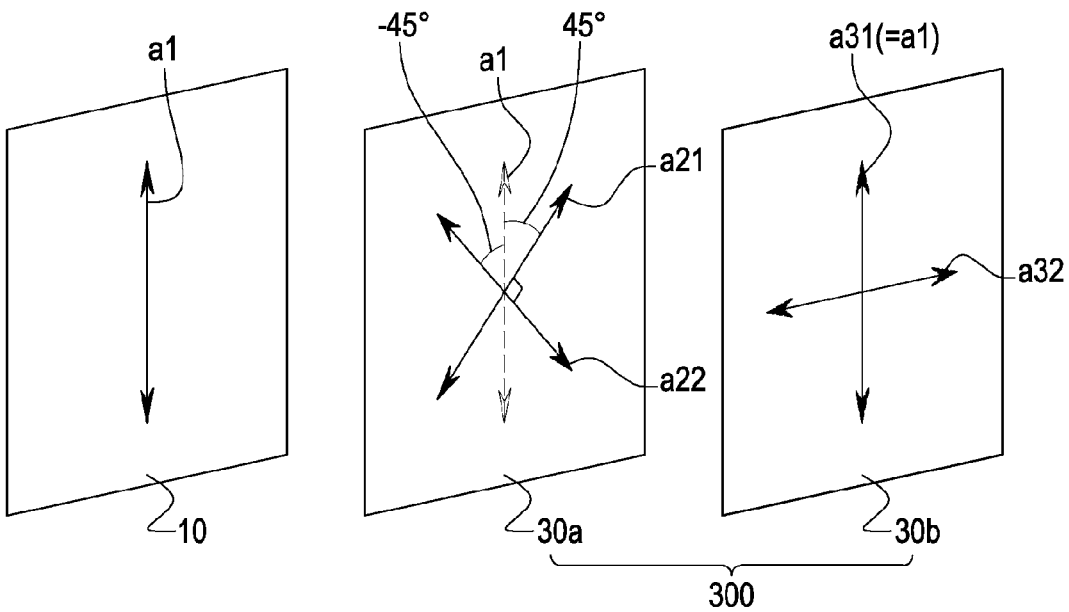
FIG. 12 shows the most desirable arrangement condition of the first birefringence medium and the second birefringence medium.

Firstly, with reference to FIG. 12, the first birefringence medium 30a is arranged for the directions of the principal axes a21 and a22 to be at 45° or −45° with respect to the polarized direction a1 of the linear polarizing means 10.

If the linearly polarized light is transmitted to the first birefringence means 30a for the polarization direction to be at 45° or −45° with respect to the principal axes, the vector components of the linearly polarized light are divided into ±45° and their magnitudes become the same so that a) if there are phase retardation of λ(or 0), ½λ for certain two waves, respectively, the linear polarizations according thereto have the same magnitude and perpendicular directions to each other and b) if there is phase retardation of ¼λ or ¾λ for certain waves, circular polarization happens.

If the circular polarization happens as such, then, ¼λ retarder (¼λ retarder with respect to the visible light, that is to cause the phase retardation of ¼λ with respect to the visible light or, more accurately, to the green wavelength among the visible light waves) or what causes the phase retardation between 100 nm and 180 nm with respect to the visible light (more accurately, to the green wave (560 nm) among the visible light waves) is used as the second birefringence medium 30b to make the circular polarization into linear polarization so that the tendency of linear-polarization of the light passing through the first birefringence medium 30a and the second birefringence medium 30b is maximized.

As such, if the linearly polarized light is transmitted to the first birefringence means 30a for the polarization direction to be at 45° or −45° with respect to the principal axes, the waves to be retarded by ½λ become the linearly polarized wave the polarization direction of which is perpendicular to the original polarization direction, the waves to be retarded by λ become the linearly polarized wave the polarization direction of which is the same as the original polarization direction and the waves to be retarded by ¼λ or ¾λ become the circularly polarized waves the rotation directions of which are different from each other, respectively.

Figure 13:
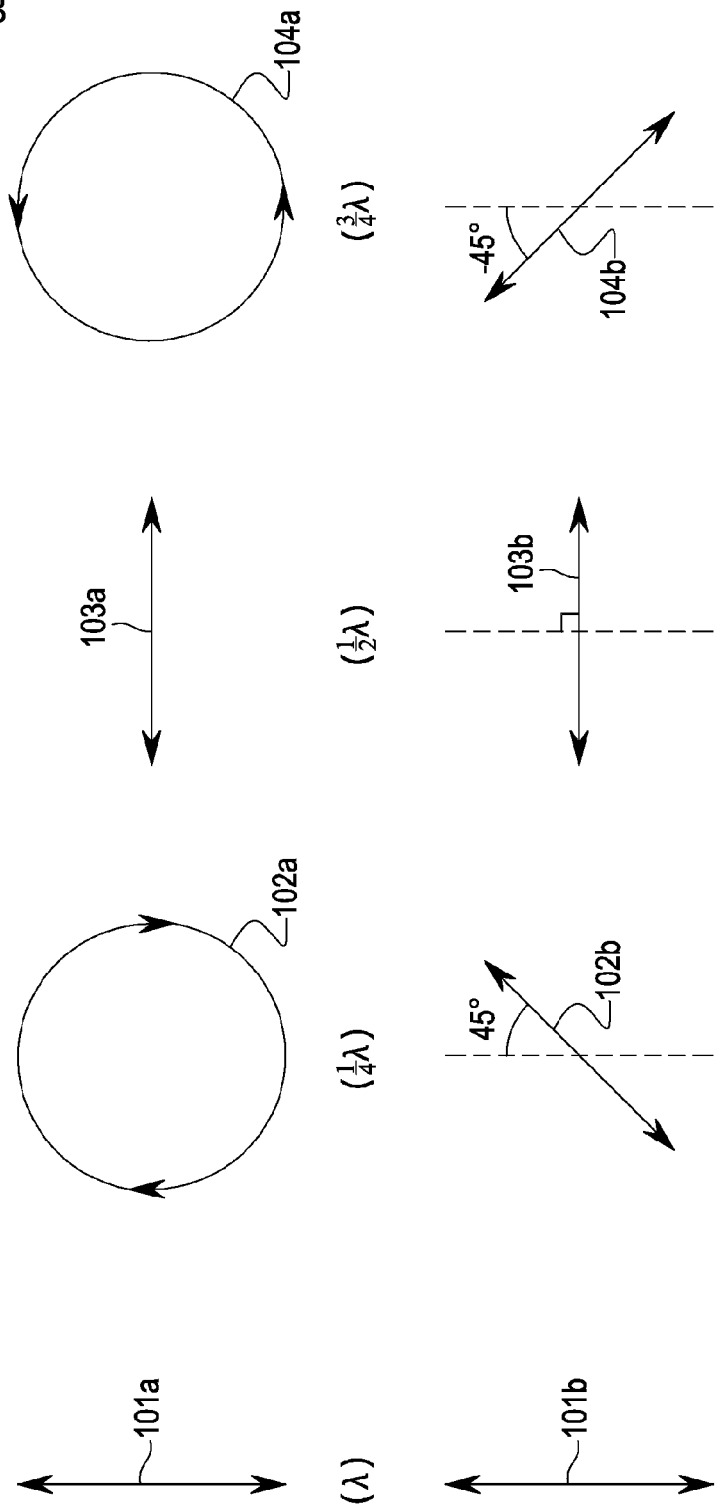
FIG. 13 shows the increasement of tendency of linear-polarization according to the arrangement of FIG. 12.

As such, if the linearly polarized light is transmitted to the first birefringence means 30a for the polarization direction to be at 45° or −45° with respect to the principal axes thereof, with reference to FIG. 13, the light waves, as they pass through the first birefringence means 30a, become the linear polarization 101a the polarization direction of which is the same as the original polarization direction, the linear polarization 103a the polarization direction of which is perpendicular to the original polarization direction, two differently circular polarizations 102a and 104a the rotation directions of which are different from each other and elliptical polarizations according to the phase retardations therebetween.

Then, the light waves pass through the second birefringence medium 30b. If the ¼λ retarder is adopted for the second birefringence medium 30b and the principal axes are arranged to coincide with the polarization direction of the originally inputted linearly polarized light or to be perpendicular thereto, with reference to FIG. 13 again, the circular polarizations 102a and 104a become linear polarizations 102b and 104b the polarization directions of which are at angle of 45° or −45° with respect to the polarization direction of the originally inputted linearly polarized light, respectively, and the linear polarizations 101a and 103a the polarization directions of which are the same as that of the originally inputted linearly polarized light or perpendicular thereto keep their linear polarization directions as indicated by 101b and 103b.

Thus, it can be said that the tendency of linear polarization is maximized when the four different linear polarizations the polarization directions of which are different from one another according to wavelengths in the range of the visible light waves are produced without the light waves near to the circular polarizations.

As such, the linearly polarized light is transmitted to the first birefringence medium 30a with the angle of 45° or −45° to the principal axes and then the amount of the phase-retardation and the arrangement angle of the second birefringence medium 30b are adjusted. By this way, it is possible to maximize the tendency of linear-polarization.

Figure 11:
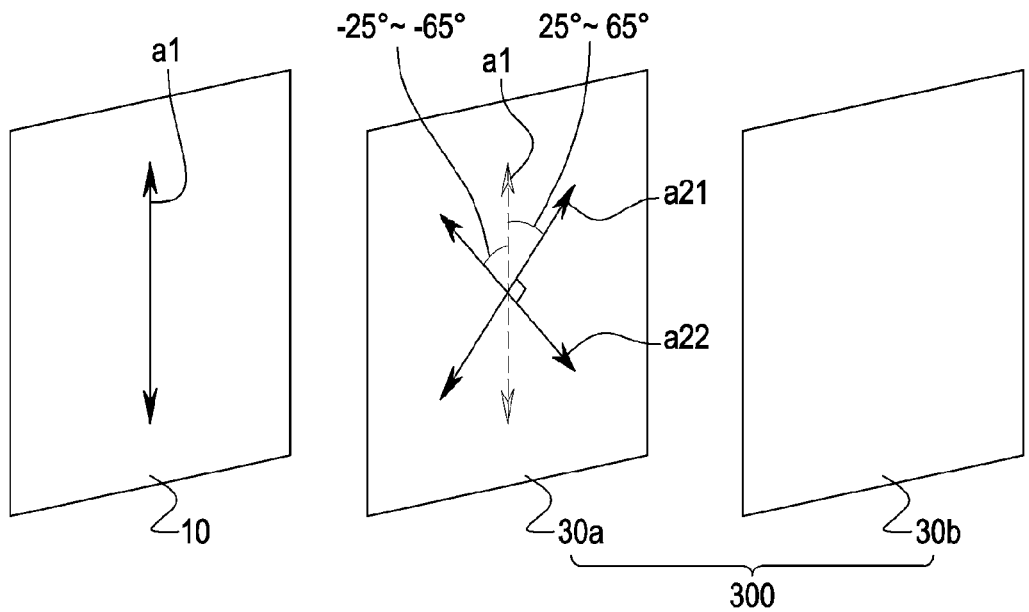
FIG. 11 shows arrangement condition of principal axes of a first birefringence medium.

With reference to FIG. 11, it is desirable that the first birefringence medium 30a is arranged for the principal axes thereof to be at angle a21 between 25° and 65° or at angle a22 between −25° and −65° with respect to the polarization direction a1 of the linearly polarized light transmitted thereto.

It is the most desirable if the principal axes of the first birefringence medium 30a are arranged to be 45° or −45° with respect to the polarization direction a1 of the linearly polarized light. However, if the principal axes of the first birefringence medium 30a are arranged to be at angle between 25° and 65° or between −25° and −65° with respect to the polarization direction a1 of the linearly polarized light as described, the chroma is well kept without being lowered sharply according to the sensory experiment.

In this case, although the perfect four linear polarizations are not obtained, the elliptical polarizations near to the linear polarization are obtained. Thus, the chroma is well kept in a certain degree.

If the principal axes of the first birefringence medium 30a are not arranged to be at angle of 45° or −45° with respect to the polarization direction a1 of the linearly polarized light, three linearly polarizations are obtained. In this case, one of the two polarizations obtained by passing the linearly polarized light a1 through the first birefringence medium 30a does not coincide with either of the principal axes of the second birefringence medium 30b and the linear polarization not coinciding with either of the principal axes of the second birefringence medium 30b becomes elliptical polarization. As a result, the three linearly polarizations are obtained. However, in this case, apparently, the tendency of linear-polarization is increased.

As described above, it is desirable if the second birefringence medium 30b is ¼λ retarder because it can make the circular polarization from through the first birefringence medium 30a the linear polarization.

As well known, the ¼λ retarder is also referred as ¼λ wave plate or quarter-wave plate.

Also, if the ¼λ retarder is not used as the second birefringence medium 30b, it is desirable to use what causes phase retardation between 100 nm and 180 nm with respect to the visible light (more accurately, to the green wave (560 nm)). Because 100 nm is ¼λ of violet (400 nm) and 180 nm is almost ¼λ of red (700 nm) and it is possible to have similar effect near to retardation of ¼λ when the phase-retardation is between 100 nm and 180 nm. In this case, 140 nm is the best because the ¼ of 560 nm is 140 nm.

In this case, the circular polarization or the elliptical polarization near to the circular polarization from through the first birefringence medium 30a passes through the second birefringence medium 30b causing the phase retardation between 100 nm and 180 nm and become the linear polarization or, at least, the elliptical polarization near to the linear polarization. Thus, the linearly polarized light transmitted to the first birefringence medium 30a passes through the first birefringence medium 30a and the second birefringence medium 30b so that the tendency of linear-polarization increases, the chroma of the generated color is improved and the various colors can be generated.

As described above, the first birefringence medium 30a and the second birefringence medium 30b may be either the uniaxial crystal or biaxial crystal and it is desirable that the principal axes are included in the plane in case of the uniaxial crystal and it is desirable that the polarized light passes through the plane including the two principal axes (that is, optic axes) among the three principal axes along the direction of the rest one principal axis (not the optic axis) in case of the biaxial crystal.

However, generally, when a light (not polarized) is transmitted to a certain birefringence medium, one light wave having a certain direction of polarization component propagates more rapidly or more slowly than another light having another direction of polarization component among innumerable polarization components at cross section perpendicular to the propagation direction of the light transmitted thereto and this is the birefringence in the end and by this when the polarized light passes out through the birefringence medium, there are different phase retardations according to wavelengths.

Accordingly, it is possible to use as the first birefringence medium and the second birefringence medium if there result in different phase retardations according to wavelengths when the transmitted polarized light passes out therethrough even though it is not the desirable case that the first birefringence medium and the second birefringence medium are the uniaxial crystal and the principal axes thereof are included in the plane or that the first birefringence medium and the second birefringence medium are the biaxial crystal and the polarized light passes through the plane including the two principal axes of the first birefringence medium and the second birefringence medium among the three principal axes along the direction of the rest one principal axis.

In this case, the visible light having passed through the first birefringence medium after it had been linearly polarized should have the phase retardation between 600 nm and 1400 nm and preferably between 900 nm and 1200 nm and the visible light having passed through the second birefringence medium should have the phase retardation between 100 nm and 180 nm, preferably of 140 nm, with respect to the green wave (560 nm). Also, in case of the second birefringence medium, it is preferable to use the ¼λ retarder as the second birefringence medium as described above.

However, it is possible that there would be lowering in variety of colors or in chroma of color compared to the desirable case that, as for the first birefringence medium 30a and the second birefringence medium 30b, the principal axes are included in the plane if they are the uniaxial crystal or that the polarized light passes through the plane including the two principal axes among the three principal axes along the direction of the rest one principal axis if they are the biaxial crystal.

Figure 14:
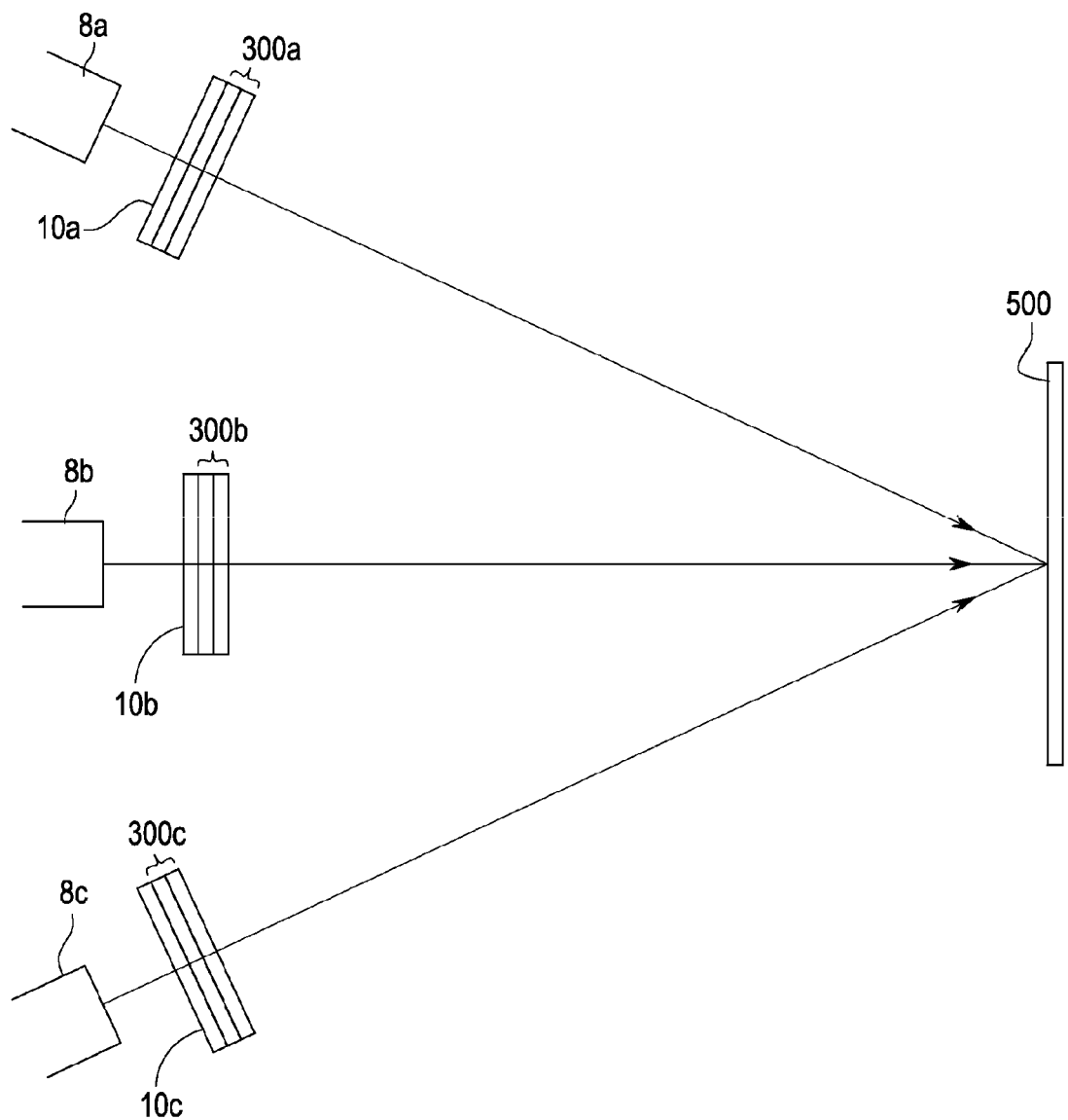
FIG. 14 shows another embodiment of the present invention.

FIG. 14 is a view showing a color generation device 2000 according to the another embodiment of the present invention.

In this case, a plurality of light sources 8a, 8b and 8c are provided and linear polarizing means 10a, 10b and 10c and means for increasing tendency of linear polarization 300a, 300b and 300c are provided for each of the light sources 8a, 8b and 8c, respectively.

Each of the light emitted from the light sources 8a, 8b and 8c passes through the linear polarizing means 10a, 10b and 10c and the means for increasing tendency of linear-polarization 300a, 300b and 300c, respectively, and transmits to the same display means 500.

According to the present invention, a plurality of the light sources 8a, 8b and 8c go on and off with respect to one another. In this case, the generated color on the display means 500 changes according to the on and off of the light sources.

As described above, the present invention passes a linearly polarized light through two birefringence media in series and adjusts arrangement or characteristic of each of the birefringence media to maximize tendency of linear-polarization of the light to be output. The light in which the tendency of linear-polarization is maximized is transmitted to the display means to improve chroma of color generated on the display means and make it possible generate various colors.

What is claimed is:

1. Means for increasing tendency of linear polarization, which receives and passes out a linearly polarized light, comprising:
   (a) a first birefringence medium; and
   (b) a second birefringence medium;
   (c) a linear polarizing means configured to receive light from a light source and to convert the light into linearly polarized light passing to the first birefringence medium; wherein,
   (d1) the first birefringence medium and the second birefringence medium are in the form of film, sheet or plate and exclude liquid crystal,
   (d2) the first birefringence medium and the second birefringence medium are arranged in series so that the linearly polarized light passes through them in sequence,
   (d31) the first birefringence medium is arranged for principal axes thereof not to be the same direction as the polarization direction of the linearly polarized light and not to be perpendicular to the polarization direction of the linearly polarized light, and phase retardation of the first birefringence medium is between 600 nm and 1400 nm with respect to visible light waves(400 nm to 700 nm) or with respect to visible light wave of 550 nm,
   (d32) the principal axes of the first birefringence medium are arranged to be at angle between 25° and 65° or between −25° and −65° with respect to the polarization direction of the linearly polarized light received by the first birefringence medium,
   (d41) the second birefringence means is arranged for either of the principal axes thereof to be within angle from −20° to 20° with respect to the polarization direction of the linearly polarized light received by the first birefringence medium, or, within angle from −20° to 20° with respect to the direction symmetric to the polarization direction of the linearly polarized light received by the first birefringence medium with respect to either of the principal axes and of the first birefringence medium,
   (d42) the second birefringence medium is ¼λ retarder or the second birefringence medium is to cause the phase retardation between 100 nm and 180 nm with respect to the green wave(560 nm).

2. Means for increasing tendency of linear polarization as claimed in claim 1 wherein the phase retardation of the first birefringence medium is between 900 nm and 1200 nm with respect to visible light waves(400 nm to 700 nm) or with respect to visible light wave of 550 nm.

3. Means for increasing tendency of linear polarization as claimed in claim 1 wherein the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

4. Means for increasing tendency of linear polarization as claimed in claim 1 wherein the principal axes of the first birefringence medium are arranged to be 45° or −45° with respect to the polarization direction of the linearly polarized light received by the first birefringence medium.

5. Means for increasing tendency of linear polarization as claimed in claim 4 wherein the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

6. Means for increasing tendency of linear polarization as claimed in claim 1 wherein the linear polarizing means, the first birefringence medium and the second birefringence medium are attached to each other in sequence through which the light emitted from the light source passes.

7. Means for increasing tendency of linear polarization as claimed in claim 6 wherein the principal axes of the first birefringence medium and second birefringence medium are arranged at cross sections perpendicular to propagation direction of the light received thereby, respectively.

8. Color generation device for generating improved color by increasing tendency of linear polarization, comprising:
  (a0) a linear polarizing means configured to receive light from a light source and to convert the received light to linearly polarized light,
  (a) means for increasing tendency of linear polarization receiving and passing out the linearly polarized light from the linear polarizing means, which includes a first birefringence medium and a second birefringence medium; wherein,
  (a1) the first birefringence medium and the second birefringence medium are in the form of film, sheet or plate and exclude liquid crystal,
  (a2) the first birefringence medium and the second birefringence medium are arranged in series so that the linearly polarized light passes through them in sequence,
  (a31) the first birefringence medium is arranged for principal axes thereof not to be the same direction as the polarization direction of the linearly polarized light and not to be perpendicular to the polarization direction of the linearly polarized light, and phase retardation of the first birefringence medium is between 600 nm and 1400 nm with respect to visible light waves(400 nm to 700 nm) or with respect to visible light wave of 550 nm,
  (a32) the principal axes of the first birefringence medium are arranged to be at angle between 25° and 65° or between −25° and −65° with respect to the polarization direction of the linearly polarized light received by the first birefringence medium,
  (a41) the second birefringence means is arranged for either of the principal axes thereof to be within angle from −20° to 20° with respect to the polarization direction of the linearly polarized light received by the first birefringence medium, or, the second birefringence means is arranged for either of the principal axes thereof to be within angle from −20° to 20° with respect to the direction symmetric to the polarization direction of the linearly polarized light received by the first birefringence medium with respect to either of the principal axes and of the first birefringence medium,
  (a42) the second birefringence medium is ¼λ retarder or the second birefringence medium is to cause the phase retardation between 100 nm and 180 nm with respect to the green wave(560 nm),
  (b) display means polarizing an incident light and transmitting the polarized light out therefrom to a user, positioned to be distanced from the means for increasing tendency of linear polarization, and the linearly polarized light being transmitted thereto after passing through the means for increasing tendency of linear polarization.

9. The color generation device for generating improved color by increasing tendency of linear polarization as claimed in claim 8 wherein the display means includes a base member and a polarizing means disposed on the base member.

10. The color generation device for generating improved color by increasing tendency of linear polarization as claimed in claim 8 wherein the display means is made of material which is either translucent or transparent, through which a part of an incident light transmits out and on the surface of which a part of the incident light is reflected back so that all or a part of the reflected light is polarized.

11. The color generation device for generating improved color by increasing tendency of linear polarization as claimed in claim 8 wherein a plurality of the light sources, a plurality of the linear polarizing means and a plurality of the means for increasing tendency of linear polarization are provided, and a plurality of the light sources go on and off with respect to each other.

12. The color generation device for generating improved color by increasing tendency of linear polarization as claimed in claim 11 wherein the linear polarizing means, the first birefringence medium and the second birefringence medium are attached to each other in sequence through which the light emitted from the light source passes.

13. The color generation device for generating improved color by increasing tendency of linear polarization as claimed in claim 12 wherein the linear polarizing means, the first birefringence medium and the second birefringence medium through which the light emitted from the light source passes rotate all together.

14. The color generation device for generating improved color by increasing tendency of linear polarization as claimed in claim 8 wherein the principal axes of the first birefringence medium are arranged to be 45° or −45° with respect to the polarization direction of the linearly polarized light received by the first birefringence medium.

15. The color generation device for generating improved color by increasing tendency of linear polarization as claimed in claim 14 wherein the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

16. The color generation device for generating improved color by increasing tendency of linear polarization as claimed in claim 8 wherein the second birefringence medium is arranged for either of the principal axes thereof to coincide with the polarization direction of the linearly polarized light received by the first birefringence medium or to coincide with a direction symmetric to the polarization direction of the linearly polarized light received by the first birefringence medium with respect to either of the principal axes of the first birefringence medium.

* * * * *